United States Patent [19]

McWilliams et al.

[11] 4,398,801

[45] Aug. 16, 1983

[54] DETONATOR-ACTIVATED BALL SHUTTER

[76] Inventors: Roy A. McWilliams; William G. von Holle, both of Livermore, Calif., granted to U.S. Department of Energy under the provisions of 42 U.S.C. 2182

[21] Appl. No.: 263,522

[22] Filed: May 14, 1981

[51] Int. Cl.³ ............................................. G05D 25/00
[52] U.S. Cl. .................................. 350/275; 123/24 R
[58] Field of Search ....................... 350/266, 273, 275; 250/229; 354/226; 123/24 R, 24 A

[56] References Cited

U.S. PATENT DOCUMENTS

| | | |
|---|---|---|
| 2,403,730 | 7/1946 | MacNeille ................ 350/266 UX |
| 2,856,831 | 10/1958 | Gipe et al. . |
| 3,275,831 | 9/1966 | Martin . |
| 3,435,213 | 3/1969 | Colbow et al. . |
| 3,553,467 | 1/1971 | Ramsey . |
| 3,581,646 | 6/1971 | Saunders . |
| 3,619,037 | 11/1971 | Pugh, Jr. . |
| 3,807,659 | 4/1974 | Winfrey . |
| 3,993,900 | 11/1976 | Hulme ....................... 250/229 |
| 4,193,695 | 3/1980 | Kojima et al. . |

*Primary Examiner*—John A. Corbin
*Assistant Examiner*—Matthew W. Koren
*Attorney, Agent, or Firm*—L. E. Carnahan; Roger S. Gaither; Richard G. Besha

[57] ABSTRACT

A detonator-activated ball shutter for closing an aperture in about 300μ seconds. The ball shutter containing an aperture through which light, etc., passes, is closed by firing a detonator which propels a projectile for rotating the ball shutter, thereby blocking passage through the aperture.

8 Claims, 3 Drawing Figures

DETONATOR-ACTIVATED BALL SHUTTER

BACKGROUND OF THE INVENTION

The invention described herein arose at the Lawrence Livermore National Laboratory under Contract No. W-7405-ENG-48 between the U.S. Department of Energy and the University of California.

The invention relates to shutter mechanisms, particularly to ball-type shutter mechanisms, and more particularly to a fast, detonator-activated ball shutter.

Shutter mechanisms have been utilized in various fields for closing or blocking passage of light. These prior efforts include shutter arrangements utilizing rotation of a member to close or cover an aperture, and are exemplified by the following patents.

U.S. Pat. No. 3,553,467 issued Jan. 5, 1971, to C. W. Ramsey discloses a pair of flat disc-shaped shutters with lever-like extensions. The shutters are pivotably mounted on a rotatable shaft whereby pins on the end of the shaft engage the lever-like extensions, thereby rotating the shutters so that they periodically block a light beam.

U.S. Pat. No. 3,807,659 issued Apr. 30, 1974, to R. C. Winfrey discloses a shutter blade which periodically covers an aperture thereby blocking a laser beam.

U.S. Pat. No. 4,193,695 issued Mar. 18, 1980, to K. Kojima et al discloses an optical system having a light-chopping element in the form of a solid circular disc that is rotated, by a motor, about an axis parallel to the diameter of the disc, thereby periodically blocking a light source.

In addition, prior shutter apparatus has utilized members having apertures or passages therethrough, the members being rotated to change the alignment of the aperture with respect to a beam of radiation energy for blocking passage of the beam therethrough. U.S. Pat. No. 3,275,831, issued Sept. 27, 1966, to P. T. Martin, and No. 3,619,037, issued Nov. 9, 1971, to A. L. Pugh, Jr., are exemplary of the prior shutter apparatus which utilize an apertured, rotatable member.

In applications such as the determination of the Raman spectra of a detonating explosive, pulsed laser beam access to the explosive through polished fused silica windows is required. However, as a result of the detonation, the unprotected windows are damaged by shrapnel or debris from the explosive, which renders them useless. In order to protect the windows, means are needed to block or prevent the debris from contacting the windows. While various shutter mechanism are known, as pointed out above, a need existed for a simply constructed, fast reacting shutter which allows a beam or pulse of radiation energy to pass to a point of use (the explosion) without debris from that point of use being directed back through the system or against the windows thereof.

SUMMARY OF THE INVENTION

An object of the invention is to provide a fast shutter appartus.

A further object of the invention is to provide a shutter apparatus which prevents the passage of undesirable products from passing through an associated systems.

A further object of the invention is to provide an apertured, rotatable shutter mechanism which allows for only one-way passage therethrough.

Another object of the invention is to provide a detonator-activated ball shutter mechanism.

Another object of the invention is to provide a detonator-activated ball shutter for preventing damage of windows in an associated apparatus due to debris passing thereagainst.

Another object of the invention is to provide a detonator-activated ball shutter for use in an explosion chamber which allows the passage of radiant energy through the shutter, but prevents debris in the chamber from damaging windows associated with the explosion chamber.

The present invention fills the above mentioned need and fulfills the above objects by providing a detonator-activated, apertured ball shutter having a response time of about 300 $\mu$seconds. The apertured ball shutter of the invention utilizes a projectile to rotate the ball shutter, and is capable of protecting windows in a shot chamber from being damaged by debris from explosions within the chamber.

More specifically, the present invention involves an apertured, rotatable ball having a lever attached thereto for rotating the ball. Activation of a detonator drives a projectile against the lever causing rotation of the ball, whereby passage of light or material through the aperture in the ball is blocked.

DETAILED DESCRIPTION OF THE INVENTION

The invention is a fast, detonator-activated, ball shutter, wherein a detonator contained in a firing chamber propels a projectile onto a lever arm for rotating the ball shutter.

While the invention has applications in many fields, it is particularly applicable in the testing of explosives, wherein at least portions of the testing apparatus must be protected from shrapnel or debris from the explosion. For example, when detonating the explosive, a pulsed laser beam is utilized with the beam being directed on the explosive through polished fused silica or quartz windows, which, if unprotected, are damaged by shrapnel or debris from the explosive, rendering them useless for further tests. By positioning the fast, apertured ball shutter of the invention between the windows and the explosive, the laser beam passes through the aperture of the ball shutter, at or near the time of the explosive detonation, whereafter the ball is rotated so as to prevent passage back through the aperture of the debris, etc., from the explosive, thereby protecting the windows through which the laser beam passes.

Figure 2:
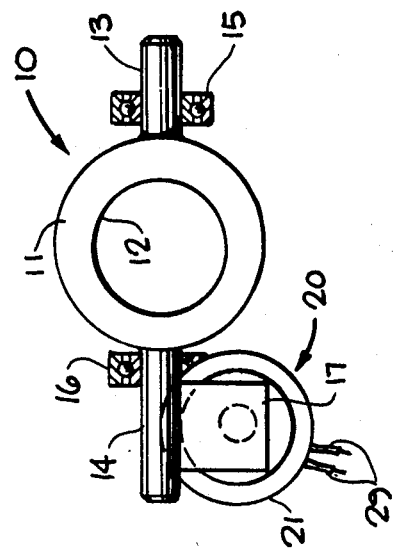
FIG. 2 is an end view of the FIG. 1 embodiment.
Figure 1:
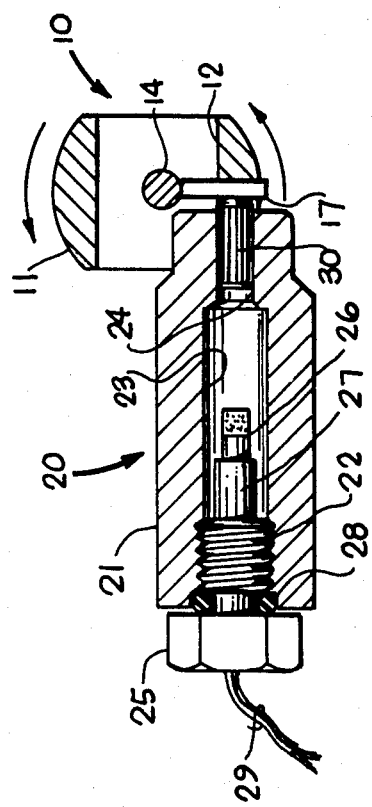
FIG. 1 is a cross sectional view of an embodiment of a ball shutter made in accordance with the invention.

Referring now to FIGS. 1 and 2, the illustrated embodiment of the invention basically consists of a shutter assembly indicated generally 10 and a detonator assembly generally indicated at 20 which is positioned so as to activate the shutter assembly.

The shutter assembly 10 includes a ball-shaped member 11 having an opening or aperture 12 extending therethrough and secured to a pair of shafts or pins 13 and 14 which are rotatably mounted in bearings 15 and 16, respectively. A lever arm 17 is fixedly secured to shaft 14 such that movement of the lever arm causes rotation of the ball-shaped member 11.

The detonator assembly 20 includes a housing or casing 21 containing therein in axial alignment a threaded opening 22, a firing chamber 23, and a projectile passageway or barrel 24. A threaded member or bolt 25 is positioned in the threaded opening 22 and has secured thereto a detonator 26 via a shock spacer 27, with the detonator and shock spacer being located within firing chamber 23. A seal 28, such as an O-ring, is positioned between bolt 25 and housing 21, with electrical leads 29 passing through bolt 25 and shock spacer 27 for operative connection to detonator 26. A projectile 30, such as a dowel or pin, is positioned in barrel 24.

In operation of the embodiment of FIGS. 1 and 2, detonator 26, located in firing chamber 23, is activated by a power source, not shown, via leads 29 and the explosive force of the detonator 26 causing the projectile 30 to be propelled through barrel 24 which moves lever arm 17 of shutter assembly 10. Movement of lever arm 17 causes rotation of ball-shaped member 11, as indicated by the arrows, with a resulting change in the axial direction of opening or aperture 12 therein. The time required for rotation of the member 11 is about 300 μseconds (0.3 ms).

By way of example, ball-shaped member 11 may be constructed of brass or steel with an outer diameter of 1¼ inches, and with the opening or aperture 12 being 11/16 inch. Shafts 13 and 14 may be dowel pins made of steel having ¼-inch diameters and lengths of 1 inch and 1½ inch. Lever arm 17 may be made of steel or oil-hardened material with a dimension of ⅛×½×½ inch. Housing 21 may be made of tool steel 4140 CMS with threaded opening 22 having a diameter of ⅜ inch and length of ⅝ inch; firing chamber 23 having a diameter of ⅜ inch and length of 1-3/16 inch, with barrel 24 having a diameter of ¼ (0.251) inch and length of ⅝ inch. Bolt 25 may be made of Std. Hex. Bolt-⅜-13, UNC-2A with a ⅜-inch diameter shank and overall length of 1 inch. Detonator 26 may be of the SE-12 type containing 0.3 grams of P.E.T.N. type explosive, and activated by a voltage of 2,000 volts passing through electrical leads 29. Shock spacer 27 may be constructed of aluminum or brass with a diameter of ¼ inch and length of ½ inch. Seal 28 may be a ⅛×⅛-inch O-ring made of Neoprene or Nitrile (Buna N). Projectile 30 may be a dowel pin made of steel with a ¼-inch diameter and length of ½ inch.

Figure 3:
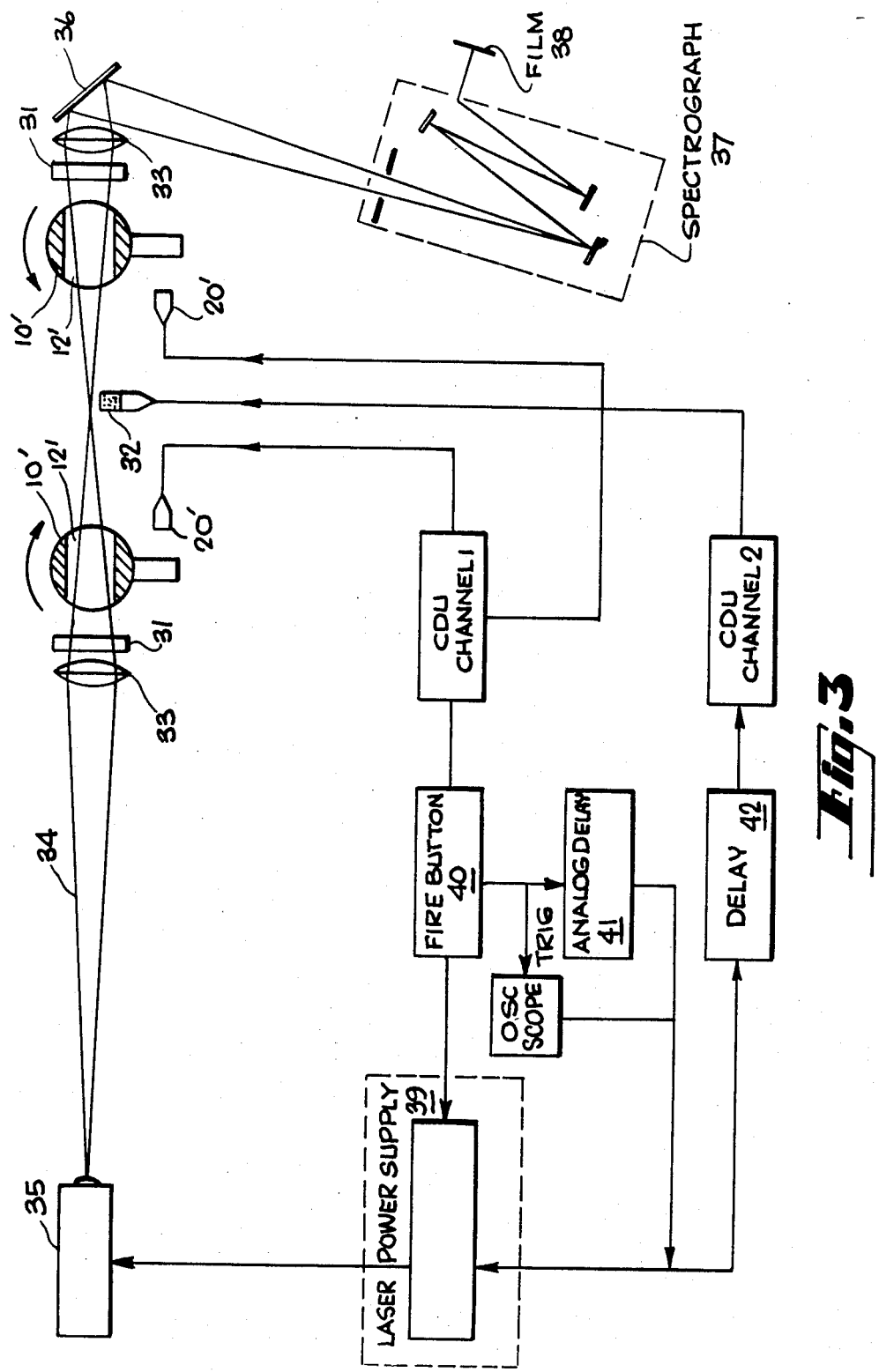
FIG. 3 schematically illustrates an application for the invention for explosive testing.

FIG. 3 illustrates an application of the invention in protecting quartz pressure windows of an explosion chamber wherein the Raman spectra of a detonating explosive is being determined, using a pulsed laser beam which passes through the explosion chamber and reflected into a spectrograph. The details of the various components of the FIG. 3 apparatus are not part of the present invention and thus are only generally described. Two ball shutter assembles 10' and associated detonator assemblies 20' are positioned intermediate a pair of quartz pressure windows 31 and an explosive (10 gram P.E.T.N.) 32 being tested. A pair of optical elements or lens 33 are located outside of windows 31. A laser beam 34 from an amplifier 35 is directed through a lens 33, a window 31, aperture 12' in a first shutter assembly 10', past explosive 32, through aperture 12' in the second shutter assembly 10', window 31 and lens 33 onto a reflector member or mirror 36 into a spectrograph 37, the output of which is recorded on a film. 38. The laser pulse or beam 34 is generated via a laser power supply 39 which is operatively connected to a fire button 40 which is also connected via a CDU channel 1 to detonator assemblies 20'. Fire button 40 is additionally connected via a 1.5 ms analog delay 41 and a 0.1 ms delay 42 to a CDU channel 2 which, in turn, is connected to the explosive 32.

By way of example, in operation of the FIG. 3 apparatus, the detonator assemblies 20' were fired 951.4 μseconds before the laser pulse 34 and 2.5 ms before the explosiver 32 is fired. The laser pulse or pulses pass unobstructed through apertures 12' in shutter assemblies 10', whereafter this path is closed off to fragments or debris from the explosive 32 by rotation of the shutter assemblies 10' as indicated by the arrows, whereby the windows are protected. Tests established that in the FIG. 3 apparatus about 2.5 ms were required for the start of closing of shutters 10' due to the time delays and an additional 0.3 ms (300 μseconds) was required to completely close off the aperture 12' by rotation of the ball shutter. Thus, it was shown that the ball shutter has the capability of closure in 300 μseconds. For additional description of tests conducted on the invention, attention is directed to UCID-18814, by R. A. McWilliams et al, entitled "A Fast Detonator-Activated Ball Shutter for High Exlosive Experiments", dated Sept. 19, 1980.

It has thus been shown that the present invention provides a fast rotating shutter which fills the needs mentioned above, and has a response time of about 300 μseconds.

While a particular embodiment of the invention has been illustrated and described, modifications will become apparent to those skilled in the art, and it is intended to cover in the appended claims all such modifications as come within the scope of the invention.

What we claim is:

1. A shutter mechanism comprising: a rotatable member having an opening therethrough through which light passes, and an explosive-activated means for rotating said member such that light is substantially blocked from passing through said opening, said explosive-activated means including means defining a firing chamber and a barrel, an explosive detonator positioned in said firing chamber, a projectile at least partially positioned in said barrel, whereupon activation of said detonator causes said projectile to be driven through said barrel for rotating said member.

2. The shutter mechanism of claim 1, wherein said member is provided with a lever, whereby said projectile moves said lever for rotating said member.

3. The shutter mechanism of claim 2, wherein said member is supported on a shaft means, and wherein said lever is secured to said shaft means.

4. A shutter mechanism comprising: a rotatable member having an opening therethrough through which light passes, and explosive-activated means for rotating said member such that light is substantially blocked from passing through said opening, said rotatable member being mounted on at least one shaft, and provided with a lever arm secured to said shaft; said explosive-activated means comprising a housing defining therein a firing chamber and a barrel extending from said firing chamber to an exterior portion of said housing and positioned to be in alignment with said lever arm, an explosive detonator operatively mounted in said firing chamber, and a projectile at least partially positioned in said barrel, whereby detonation of said explosive detonator drives said projectile against said lever arm causing rotation of said member.

5. The shutter mechanism of claim 4, wherein said rotatable member is of a ball-shaped configuration with said opening extending substantially centrally therethrough.

6. The shutter mechanism of claim 4, wherein said housing additionally includes a threaded opening in axial alignment with said firing chamber and said barrel, and means threadedly positioned in said threaded opening for positioning said detonator in said firing chamber.

7. The shutter mechanism of claim 6, wherein said last-mentioned means constitutes a bolt-like member, and is secured to said detonator via a shock spacer.

8. In an apparatus for allowing passage therethrough in one direction along a path and preventing passage therethrough from the opposite direction, the improvement comprising: a detonator-activated ball shutter havin a member defining an aperture therein positioned to allow passage therethrough along a path, and an explosive detonator for activating means for rotating said member such that said aperture is not positioned to allow passage therethrough along the path, said member being provided with a lever secured thereto, said means for rotating said member including a projectile, said projectile being driven by force created by said explosive detonator to contact said lever causing rotation of said member.

* * * * *